(No Model.)

J. M. KING.
GRAIN DRILL.

No. 573,416. Patented Dec. 15, 1896.

Witnesses
E. H. Monroe
V. B. Hillyard

Inventor
James M. King.
By his Attorneys,
C. A. Snow & Co.

UNITED STATES PATENT OFFICE.

JAMES M. KING, OF BLUE SPRINGS, NEBRASKA.

GRAIN-DRILL.

SPECIFICATION forming part of Letters Patent No. 573,416, dated December 15, 1896.

Application filed October 14, 1895. Serial No. 565,618. (No model.)

*To all whom it may concern:*

Be it known that I, JAMES M. KING, a citizen of the United States, residing at Blue Springs, in the county of Gage and State of Nebraska, have invented a new and useful Grain-Drill, of which the following is a specification.

This invention relates to grain-drills and rotary colters, and aims to provide a drill which will facilitate the planting of seed in cornstalk-ground or millet in stubble-ground, and which will enable the opening of hard, sod, or pasture ground for the reception of seed without requiring plowing of the land.

With these and other objects as pertain to the nature of the invention the latter consists, primarily, of a seed-tube having a relatively fixed cutting-blade and a rotary colter at its lower end, arranged to stand at an angle to each other, the front ends approaching and the rear ends diverging, and the lower edge of the cutting-blade curving outwardly to lift the ground and open the furrow for the reception of the seed.

The invention also consists of the peculiar formation of the rotary colter, whereby it is adapted to be mounted on a bearing or journal projecting laterally from the side of a shank and to be used for plowing.

The improvement also further consists of the novel features and the peculiar combination and construction of parts which hereinafter will be more fully set forth and claimed, and which are illustrated in the accompanying drawings, in which—

Figure 1:
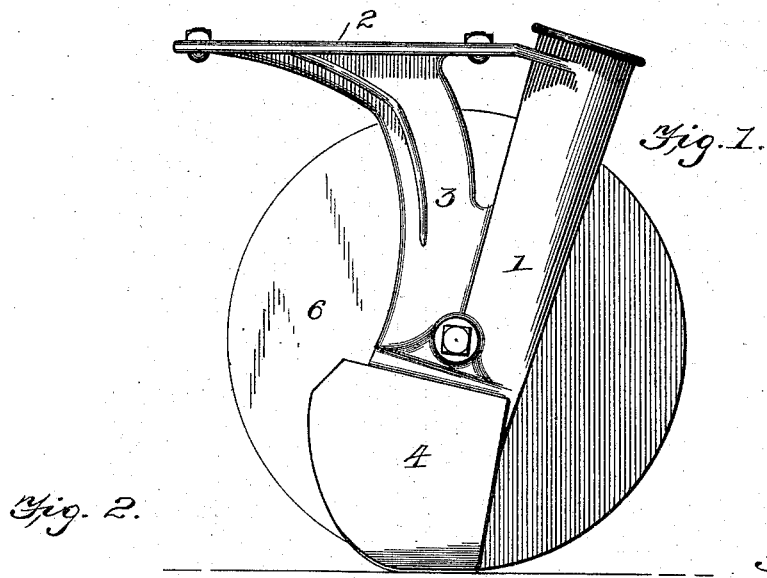
Figures 2, 3, 4:
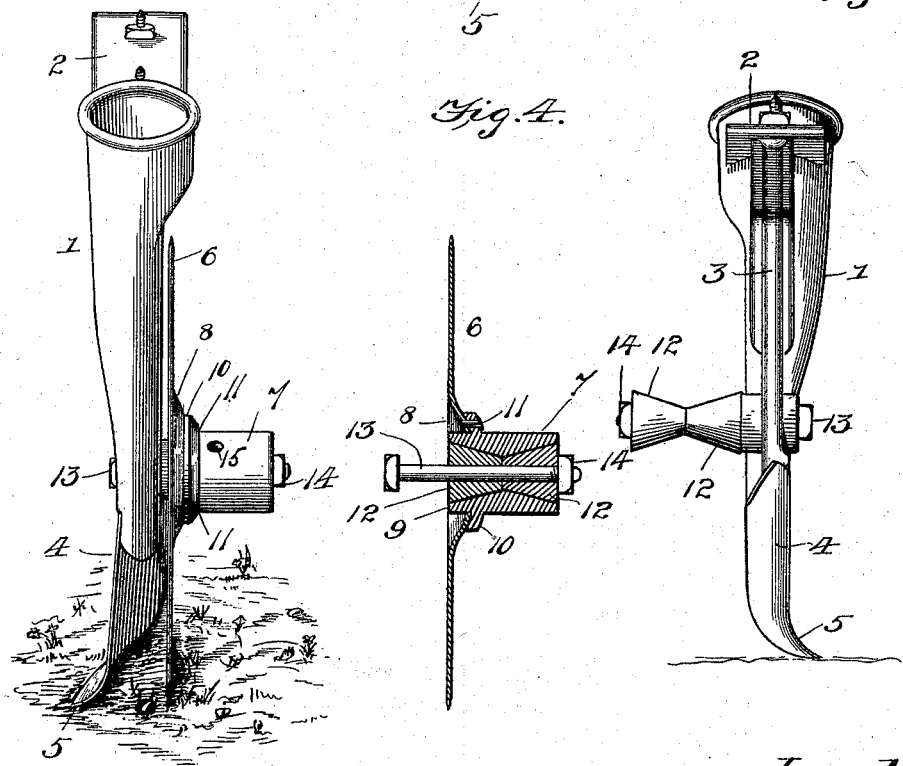

Figure 1 is a side elevation of a seed-tube having the invention applied thereto. Fig. 2 is a rear perspective view thereof. Fig. 3 is a front view of the seed-tube, the rotary colter being detached. Fig. 4 is a vertical cross-section of the rotary colter and its hub.

Like numerals of reference designate corresponding parts in all the figures of the drawings.

The seed-tube 1 may be of any desired form, and is provided with an outwardly-extending bar 2, which is apertured for the passage of the fastenings, by means of which the seed-tube is attached to the bar or frame of the drill, and this bar is strengthened by means of a brace 3, which is located in the angle formed between the bar 2 and the seed-tube 1. The cutting-blade 4 is attached in any convenient manner to the lower end of the seed-tube and its front edge curves rearwardly for the better penetration of the blade into the ground when the device is in service. The lower edge of the cutting-blade curves outwardly, as shown at 5, to lift the soil and open the furrow for the reception of the seed to be planted. The rotary colter 6 is disposed on the opposite side of the seed-tube to that upon which the cutting-blade 4 is placed and its lower end is about in the same plane as the lower end of the cutting-blade 4, and this rotary colter is mounted upon a bearing or journal extending laterally from the side of the seed-tube. The front edge of the cutting-blade 4 approaches the plane of the colter 6, and the colter and the cutting-blade stand at an angle to each other and to the line of draft, so as to secure proper clearance for the depositing of the seed in the furrow formed by the colter and cutting-blade as the device is drawn over the field. The sole purpose of the rotary colter is to cut through the soil, and the cutting-blade 4 acts as a divider, and its outwardly extending or curved lower edge 5 lifts the soil and forms the furrow into which the seed is dropped, the said furrow closing by the dropping of the soil immediately in the rear of the cutting-blade as the device advances over the ground.

The rotary colter is a disk-shaped blade and is formed from sheet-steel and is centrally apertured for the reception of the hub 7, and its inner or central portion immediately surrounding the said aperture is deflected to one side of the plane of the colter so as to form a dish-shaped or concavo-convex portion 8, which surrounds the inner portion of the hub and serves to strengthen and stiffen the colter and provide a space in which is located the inner projecting end portion 9 of the hub.

The hub 7 is cast and is formed with an exterior annular flange 10, which is fitted against the outer side of the dish or concavo-convex portion 8 of the colter, and which is apertured at proper intervals to receive the rivets or fastenings 11, by means of which the colter is secured to the hub. The bore of the hub is enlarged from a middle point outward toward its ends to conform to the oppositely-disposed cone-bearings 12, upon which the hub is mounted, and which are placed upon a pin or bolt 13, attached to the seed-tube 1. The outer end of the pin or bolt 13 is threaded and receives a nut 14, by means of which the cone-bearings 12 can be brought together, so as to compensate for wear and secure a close joint for the hub 7. An oil-opening 15 is formed in the outer portion of the hub 7 for the introduction of a suitable lubricant to the wearing parts.

The device herein shown can be applied to any desired make or style of grain drill or planter and can be successfully used upon any ground without requiring the plowing or loosening thereof. It will be seen that the rotary colter can be used independently of the seed-tube and cutting-blade 4, and may be employed wherever it is desired to use a colter or cutting-disk for opening or cutting into the ground for any required purpose.

The invention is susceptible of a variety of uses, and in the adapting of the same for a special purpose it is to be understood that various changes in the form, proportion, and minor details of construction may be resorted to without departing from the spirit or sacrificing any of the advantages of this invention.

Having thus described the invention, what is claimed as new is—

1. In combination, a seed-tube, a pin or bolt applied to the lower portion of the seed-tube and projecting laterally therefrom, a sheet-metal disk having its outer portion straight and provided centrally with a hub which is mounted upon the aforesaid pin, and a cutting-blade secured directly to the lower end of the seed-tube on the side remote from the disk cutter, and having its front edge coming in the rear of the cutting edge of the disk and curving rearwardly and closely approaching the adjacent side of the disk, and having its lower end in the plane of the lower portion of the said disk and curving outwardly and away therefrom, the disk and cutting-blade diverging toward their rear ends to provide a space for the passage of the seed to the ground, substantially as set forth.

2. The herein-described rotary colter, comprising a straight sheet-metal disk having its central portion dish-shaped and apertured, a hub having an integral end portion projecting through the aperture of the colter and coming flush with a plane touching the inner side of the colter, and means for securing the hub to the central dish-shaped portion of the colter, substantially in the manner and for the purpose described.

3. The herein-described rotary colter having its outer portion straight and having its central portion dish-shaped or concavo-convex and centrally apertured, and a hub having an integral end portion projecting through the aperture of the colter, and provided with an outer annular flange which is placed exterior to and secured against the dish-shaped portion of the colter, substantially as set forth, for the purpose described.

4. The herein-specified rotary colter, having a straight outer portion and having its middle portion dish-shaped or made concavo-convex, and a hub having its end portion extending through the dish-shaped portion of the colter, and terminating in the plane of the said straight portion and having an annular flange which is fitted against the outer side of the dish-shaped portion and which is secured thereto, the bore of the hub flaring in opposite directions from an intermediate point, substantially as set forth, for the purpose described.

In testimony that I claim the foregoing as my own I have hereto affixed my signature in the presence of two witnesses.

JAMES M. KING.

Witnesses:
F. M. GALLANT,
J. C. WILLIAMS.